United States Patent
Kim et al.

(10) Patent No.: US 11,979,660 B2
(45) Date of Patent: May 7, 2024

(54) CAMERA ANALYZING IMAGES ON BASIS OF ARTIFICIAL INTELLIGENCE, AND OPERATING METHOD THEREFOR

(71) Applicant: HANWHA TECHWIN CO., LTD., Seongnam-si (KR)

(72) Inventors: Hyun Ho Kim, Seongnam-Si (KR); Jinhyuk Choi, Seongnam-Si (KR); Daebong Kim, Seongnam-Si (KR); Jaewoon Byun, Seongnam-Si (KR); Sangwook Lee, Seongnam-Si (KR); Junsik Kim, Seongnam-Si (KR); Kyoungjeon Jeong, Seongnam-Si (KR); Eunyoung Kim, Seongnam-Si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 303 days.

(21) Appl. No.: 17/475,801

(22) Filed: Sep. 15, 2021

(65) Prior Publication Data
US 2022/0006960 A1    Jan. 6, 2022

Related U.S. Application Data

(63) Continuation of application No. PCT/KR2020/003391, filed on Mar. 11, 2020.

(30) Foreign Application Priority Data

Mar. 18, 2019  (KR) .................. 10-2019-0030457
Mar. 10, 2020  (KR) .................. 10-2020-0029565

(51) Int. Cl.
*H04N 23/661* (2023.01)
*G06N 20/00* (2019.01)
(Continued)

(52) U.S. Cl.
CPC .......... *H04N 23/662* (2023.01); *G06N 20/00* (2019.01); *G06V 10/10* (2022.01); *H04N 5/2628* (2013.01);
(Continued)

(58) Field of Classification Search
None
See application file for complete search history.

(56) References Cited

U.S. PATENT DOCUMENTS

2006/0098729 A1    5/2006   Shen
2013/0040576 A1    2/2013   Yoon
(Continued)

FOREIGN PATENT DOCUMENTS

| KR | 10-0954375 B1 | 4/2010 |
| KR | 10-1302803 B1 | 9/2013 |
| KR | 10-1734320 B1 | 5/2017 |

OTHER PUBLICATIONS

B. Dieber et al., "PhD forum: Flexible Clustering in Smart Camera Networks", 2009 Third ACM/IEEE International Conference on Distributed Smart Cameras (ICDSC), Aug. 2009, XP031548093, (2 pages total).

(Continued)

*Primary Examiner* — Kaitlin A Retallick
(74) *Attorney, Agent, or Firm* — Sughrue Mion, PLLC

(57) ABSTRACT

Provided is an operating method for an artificial intelligence (AI) camera that communicate with at least one another AI camera, the operating method including: configuring a cluster for the image analysis together with other AI camera by exchanging registration information with the other AI camera; sharing, with the other AI camera, registration information about normal cameras used to access the normal cameras; receiving, based on one of the normal cameras being allocated to AI camera, an image captured by the allocated (Continued)

normal camera by accessing the allocated normal camera; analyzing the received image using an AI processor in the AI camera; and transmitting a result of the analyzing the received image together with an identifier of the allocated normal camera to an external device.

18 Claims, 10 Drawing Sheets

(51) Int. Cl.
　　　*G06V 10/10*　　　(2022.01)
　　　*H04N 5/262*　　　(2006.01)
　　　*H04N 7/025*　　　(2006.01)
　　　*H04N 7/18*　　　(2006.01)
　　　*H04N 17/00*　　　(2006.01)
　　　*H04N 23/90*　　　(2023.01)

(52) U.S. Cl.
　　　CPC ............ *H04N 7/025* (2013.01); *H04N 7/181* (2013.01); *H04N 17/002* (2013.01); *H04N 23/90* (2023.01)

(56) References Cited

U.S. PATENT DOCUMENTS

| 2016/0094773 | A1* | 3/2016 | Maciuca | H04N 23/62 348/207.11 |
|---|---|---|---|---|
| 2018/0176449 | A1* | 6/2018 | Yoon | H04L 12/10 |
| 2019/0141293 | A1* | 5/2019 | Carey | H04N 7/181 |
| 2020/0045216 | A1* | 2/2020 | Chang | H01L 27/14601 |
| 2020/0134711 | A1* | 4/2020 | Dawson | H04W 4/42 |
| 2022/0405816 | A1* | 12/2022 | Zahn | G06T 7/60 |

OTHER PUBLICATIONS

B. Dieber et al., "Flexible Clustering in Networks of Smart Cameras", 2009 IEEE 12th International Conference on Computer Vision Workshops, ICCV Workshops, Sep. 27-Oct. 4, 2009, XP031664630, (6 pages total).

Communication dated Jan. 20, 2023 issued by the European Patent Office in counterpart European Patent Application No. 20772993.0.

* cited by examiner

| VD | AD | META1 | META2 |

DOUT

CAMERA ANALYZING IMAGES ON BASIS OF ARTIFICIAL INTELLIGENCE, AND OPERATING METHOD THEREFOR

CROSS-REFERENCE TO RELATED APPLICATIONS

This application is a continuation of International Application No. PCT/KR2020/003391 filed on Mar. 11, 2020, and claims priority from Korean Patent Application Nos. 10-2019-0030457 filed on Mar. 18, 2019 and 10-2020-0029565 filed on Mar. 10, 2020, the disclosures of which are incorporated herein in their entireties by reference.

BACKGROUND

1. Field

The present disclosure relates to a camera capable of capturing an image, and an operating method therefor, and more particularly, to a camera analyzing an image on the basis of (AI), and an operating method therefor.

2. Description of Related Art

In an image capturing system including cameras connected to an external apparatus through a communication network; the cameras perform communication with an external apparatus such as a host device and a user terminal, but may also perform communication with each other in a peer-to-peer (P2P) manner. Nevertheless, conventionally, the cameras have mainly used manners of communicating with the external apparatus to provide a service. In this case, communication between the cameras is generally not performed, and instead, each of the cameras may operate individually.

Meanwhile, cameras including an (AI) function have been developed. An AI technology includes deep learning (machine learning) and elemental technologies using the deep learning. The deep learning is an algorithm that categorizes/learns features of input data by itself, and the elemental technology is a technology that simulates functions such as cognition and judgment of a human brain using the deep learning, and may include technologies such as visual understanding, inference/prediction, and knowledge representation. The visual understanding is a technology that recognizes and processes things as human vision does, and may include object recognition, object tracking, image search, human recognition, scene understanding, space understanding, image improvement, and the like. The inference/prediction is a technology that performs logical inference and prediction by analyzing information, and may include knowledge/probability-based inference, optimization prediction, preference-based planning, recommendation, and the like. The knowledge representation is a technology that automates and processes human experience information as knowledge data, and may include knowledge construction (data generation/classification), knowledge management (data utilization), and the like.

The above content is provided only for assisting in the understanding of the related art for the technical ideas of the present disclosure, and accordingly, may not be understood as a content corresponding to the prior art known to those skilled in the art to which the present disclosure pertains.

SUMMARY

Embodiments in the present disclosure provide an artificial intelligence (AI) camera capable of efficiently expanding a range of image analysis based on AI, and an operating method therefor.

According to an aspect of an embodiment, there is provided an operating method for an artificial intelligence (AI) camera that communicates with at least one another AI camera through a network, the AI camera including an AI processor configured to perform image analysis using a deep learning method, the operating method including: configuring a cluster for the image analysis together with the other AI camera by exchanging registration information about at least one of the AI camera and the other AI camera with the other AI camera through the network; sharing, with the other AI camera, registration information about normal cameras used to access the normal cameras through the network; receiving, based on one of the normal cameras being allocated to AI camera, an image captured by the allocated normal camera by accessing the allocated normal camera; analyzing the received image using the AI processor; and transmitting a result of the analyzing the received image together with an identifier of the allocated normal camera to an external device through the network.

The operating method may further include receiving registration information about an additional AI camera; and accessing the additional AI camera according to the received registration information to add the additional AI camera to the cluster.

The configuring the cluster may include communicating with the other AI camera to determine one of the AI camera and the other AI camera as a master node of the cluster, and the allocated normal camera may be selected according to a command from the master node.

The receiving the captured image may include: receiving an event alarm signal generated by the allocated normal camera; and requesting the allocated normal camera to provide the captured image in response to the event alarm signal.

The configuring the cluster may include communicating with the other AI camera to determine one of the AI camera and the other AI camera as a master node of the cluster, and the event alarm signal may be received through the master node.

The receiving the captured image may further include changing a setting value of the allocated normal camera into a predetermined value in response to the event alarm signal before requesting the allocated normal camera to provide the captured image.

The length of the image received from the allocated normal camera may be variably adjusted depending on whether a probability according to deep learning is greater than or equal to a threshold value based on the received image being analyzed using the AI processor.

The operating method may further include: communicating status messages with the other AI camera; additionally receiving an image captured by another normal camera allocated to the other AI camera by accessing the other normal camera based on the other AI camera being determined to be abnormal on the basis of the status messages; analyzing the additionally received image using the AI processor; and transmitting a result of the analyzing the additionally received images together with an identifier of the other normal camera to the external device through the network.

The AI camera may further include an image sensor, and the operating method may further include: capturing an image through the image sensor; and analyzing the captured image using the AI processor.

The transmitting the result of the analyzing the received image together with the identifier of the allocated normal camera to the external device through the network may include transmitting the captured image, first metadata, and second metadata to the external device, the first metadata may include a result of the analyzing the captured image, and the second metadata may include the result of the analyzing the received image and the identifier of the allocated normal camera.

The configuring the cluster may include: receiving the registration information about the other AI camera from a user terminal; and configuring the cluster by performing communication with the other AI camera using the received registration information.

The sharing the registration information about the normal cameras with the other AI cameras may include: receiving the registration information about the normal cameras from a user terminal; and providing the received registration information to the other AI cameras.

According to an aspect of an embodiment, there is provided a camera which may include: an optical system; a first processor configured to process an image generated according to light received through the optical system; a second processor configured to operate in response to control of the first processor and analyze the processed image on the basis of a deep learning method; and a network interface providing communication through a network, wherein the first processor is configured to: configure a cluster for an image analysis together with at least one external AI camera by exchanging registration information about at least one of the camera and the external AI camera with the external AI camera through the network; share, with the external AI camera, registration information about normal cameras used to access the normal cameras through the network; receive, based on one of the normal cameras being allocated, an image captured by the allocated normal camera by accessing the allocated normal camera; control the second processor to analyze the received image; and transmit a result of the analysis of the received image together with an identifier of the allocated normal camera to an external device through the network.

The first processor may be configured to access an additional AI camera according to registration information about the additional AI camera to add the additional AI camera to the cluster, based on the registration information about the additional AI camera being received.

The first processor may be configured to communicate with the external AI camera to determine one of the camera and the external AI camera included in the cluster as a master node of the cluster, and the allocated normal camera is selected according to a command from the master node.

The first processor may be configured to change a setting value of the allocated normal camera into a predetermined setting value before requesting the allocated normal camera to provide the captured image.

The first processor may be configured to variably adjust a length of the image received from the allocated normal camera depending on whether a probability according to deep learning is greater than or equal to a threshold value when the second processor analyzes the received image.

According to embodiments of the present disclosure, an AI camera capable of efficiently expanding a range of image analysis based on AI, and an operating method therefor are provided.

DETAILED DESCRIPTION

Figure 1:
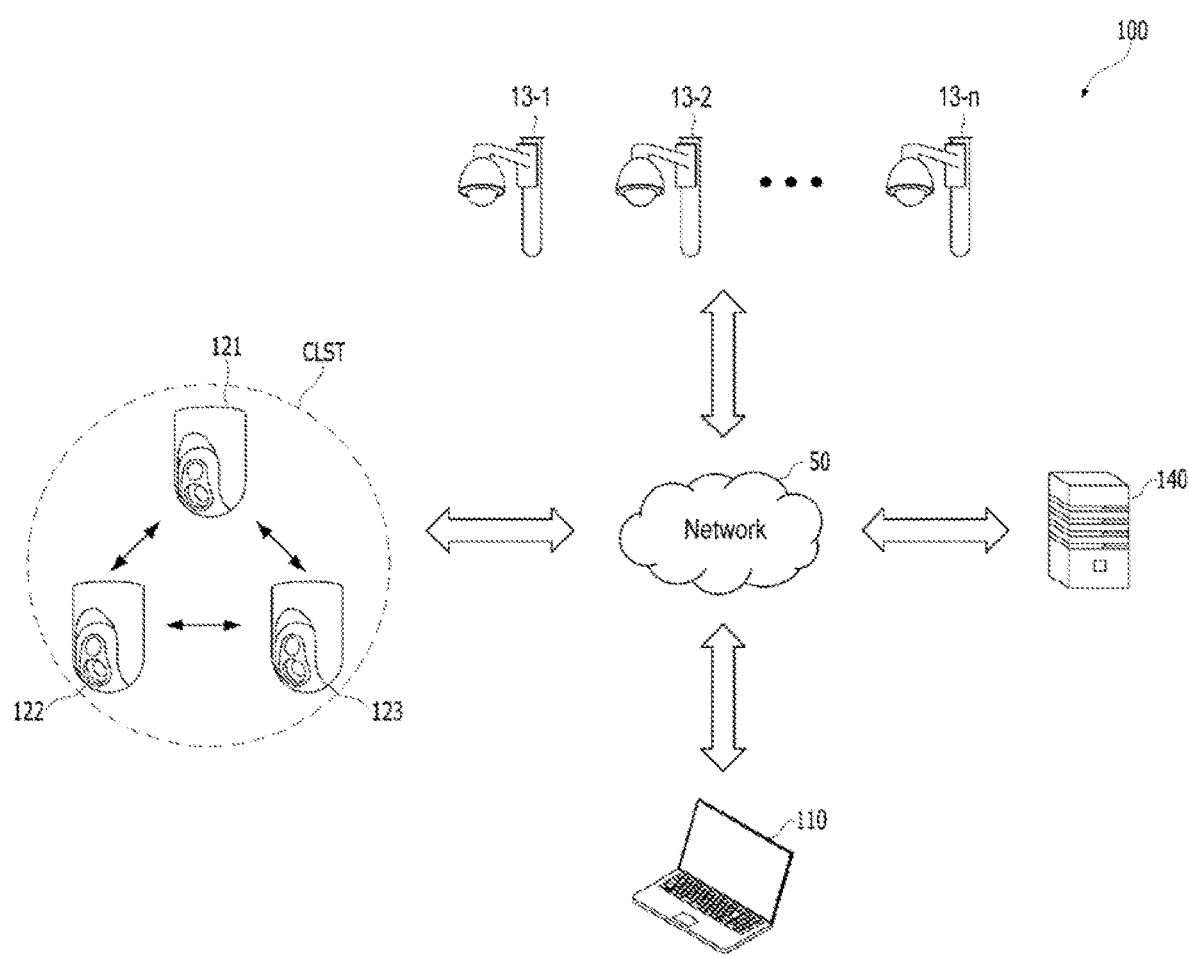
FIG. 1 is a block diagram illustrating an image capturing system, according to an embodiment.

Advantages and features of the disclosure and methods to achieve them will become apparent from the descriptions of embodiments herein below with reference to the accompanying drawings. The embodiments described herein are all example embodiments, and thus, the inventive concept is not limited to the embodiments disclosed herein but may be implemented in various different ways. The embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising" will be understood to imply the inclusion of stated elements but not the exclusion of any other elements.

Hereinafter, embodiments of the present disclosure will be described in detail with reference to the accompanying drawings.

FIG. 1 is a block diagram illustrating an image capturing system, according to an embodiment.

The image capturing system may include a plurality of devices, servers, and/or software components that operate to perform methods according to embodiments described herein. Devices and servers illustrated in FIG. 1 may be deployed in other manners, and operations and services provided by such devices and/or servers may be combined with or separated from each other in order to perform embodiments described herein, and may also be performed by more or fewer devices and servers. One or more devices and/or servers may be driven by the same or different entities, for example, companies.

Referring to FIG. 1, an image capturing system 100 may include a network 50, a user terminal 110, a plurality of artificial intelligence (AI) cameras 121 to 123, and first to n-th normal cameras 131 to 13n, and an image management server 140.

The network 50 may include at least one of a public network, at least one private network, a wired network, a wireless network, another appropriate type of network, and combinations thereof. Each of the components in the image capturing system 100 may include at least one of a wired communication function and a wireless communication function, and accordingly, these components may communicate with each other through the network 50.

The user terminal 110 may communicate with the plurality of AI cameras 121 to 123, the first to n-th normal cameras 13-1 to 13-n, and the image management server 140 through the network 50. The user terminal 110 may receive images that are being captured from each of the plurality of AI cameras 121 to 123 and the first to n-th normal cameras 13-1 to 13-n in real time, and display the received images. In addition, the user terminal 110 may access the image management server 140 to receive images stored in the image management server 140, and display the received images. In this case, the images stored in the image management server 140 may be images captured by the plurality of AI cameras 121 to 123 and the first to n-th normal cameras 13-1 to 13-n.

The image management server 140 further stores metadata that may include various types of information such as motion detection, face detection, intrusion detection, gunshot detection, object/pattern information, and similarity information about objects in association with the images. However, embodiments of the present disclosure are not limited thereto. For example, the images and the metadata associated with the images may be stored in different databases.

The metadata may be provided by the AI cameras 121 to 123. The user terminal 110 may receive the metadata from the image management server 140, display information indicated by the received metadata, receive a corresponding image from the image management server 140 in response to a user input for selecting the metadata, and display the received image.

In embodiments, the user terminal 110 may include a computer device, which may include applications for accessing components such as the AI cameras 121 to 123, the first to n-th normal cameras 13-1 to 13-n, and the image management server 140 connected to the network 50, receiving images from these components, and displaying the received images.

As noted above, the AI cameras 121 to 123 may be included in the image capturing system 100. FIG. 1 illustrates that three AI cameras 121 to 123 are provided. However, more or less than three AI cameras may be included in the image capturing system 100. Each of the AI cameras 121 to 123 includes at least one AI processor configured to perform image analysis on the basis of AI. Each of the AI cameras 121 to 123 may capture an image, analyze the captured image through the AI processor, and provide the captured image and an image analysis result to the image management server 140. In addition, each of the AI cameras 121 to 123 may record au audio, analyze the recorded audio through the AI processor, and provide the recorded audio and an audio analysis result to the image management server 140. Hereinafter, for convenience of description, embodiments of the present disclosure will be described with a focus on operations for image analysis. However, this is for convenience of description, and the technical spirit of the present disclosure may also be applied to audio analysis.

Each of the AI cameras 121 to 123 may receive an image from at least one of the first to n-th normal cameras 13-1 to 13-n, analyze the received image through the AI processor, and provide an image analysis result to the image management server 140. In this case, the normal camera may be a non-AI camera. For example, the normal camera may include a processor configured to perform conventional event detection algorithms such as motion detection, face detection, and sound detection rather than AI, but may not include an AI processor.

The AI cameras 121 to 123 may configure a cluster CLST for image analysis by exchanging registration information with one another, and each normal camera may be allocated to any one of the AI cameras 121 to 123 in the cluster CLST. In this case, the registration information may include information for accessing the AI camera, such as a uniform resource locator (URL) address, an Internet protocol (IP) address, a port number, and a camera login account of a corresponding AI camera. The registration information about each AI camera may be received from the user terminal 110 to any one of the AI cameras 121 to 123, and be shared by the AI cameras 121 to 123. In embodiments, the AI cameras 121 to 123 may periodically synchronize their registration information with one another.

Which normal camera is allocated to which of the AI cameras 121 to 123 may be determined according to various methods. For example, the AI cameras 121 to 123 may notify one another of their available resources, and the allocation of each normal camera may be performed with reference to the available resources. For example, the AI cameras 121 to 123 may communicate with one another to determine an AI camera to function as a master node, and the master node may perform a task scheduling function. The master node may allocate each normal camera to any one of the AI cameras 121 to 123 with reference to the available resources of each of the AI cameras 121 to 123.

As such, by configuring the cluster CLST including the AI cameras 121 to 123 to analyze the images of the first to n-th normal cameras 13-1 to 13-*n*, each normal camera may be allocated to any one of the AI cameras 121 to 123 with reference to, for example, the available resources. Accordingly, the analysis of the images captured by the first to n-th normal cameras 131 to 13*n* may be efficiently performed using the AI cameras 121 to 123 without providing a server including a separate AI function. Therefore, the image analysis based on the AI may be expanded to the images captured by the first to n-th normal cameras 13-1 to 13-*n* as well as the images captured by the AI cameras 121 to 123, without providing a server including a separate AI function. Accordingly, an AI camera capable of efficiently expanding a range of image analysis based on AI, and an image capturing system including the same may be provided.

Figure 2:
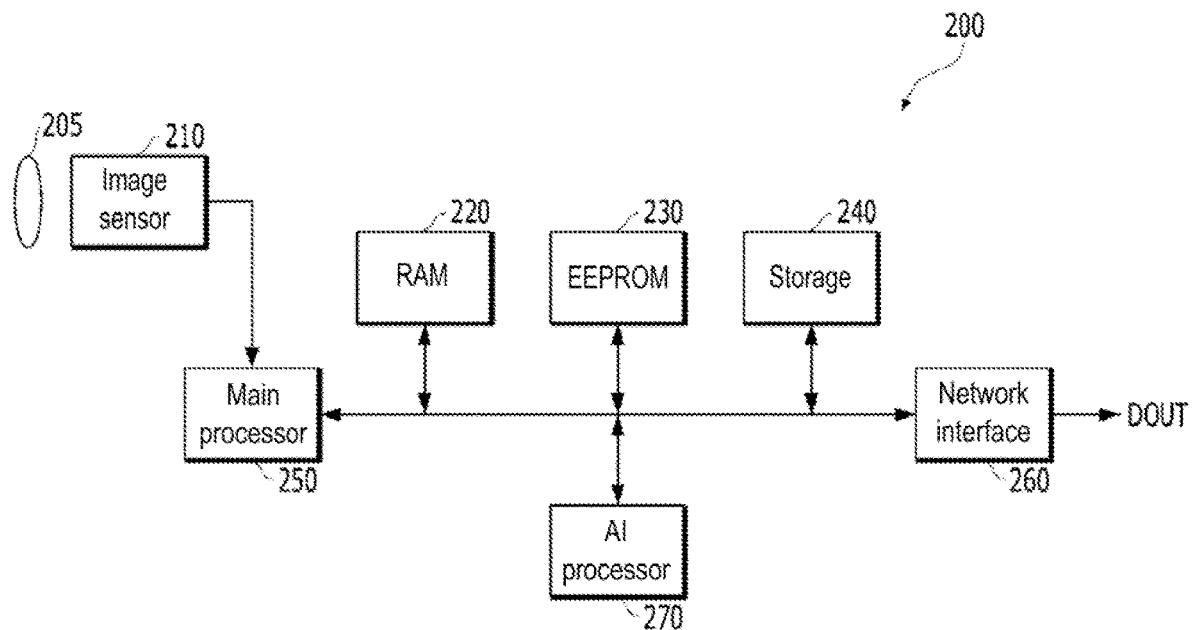
FIG. 2 is a block diagram illustrating z n embodiment of artificial intelligence (AI) camera shown in FIG. 1.
Figure 3:
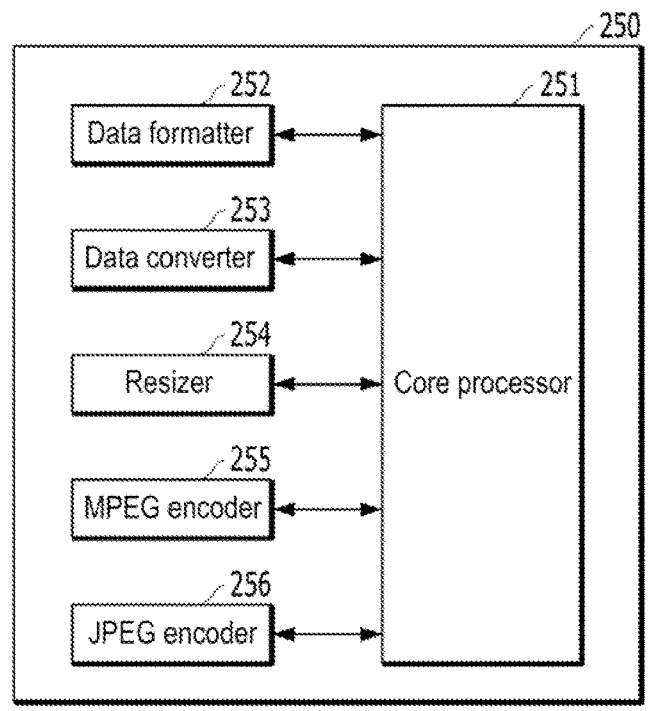
FIG. 3 is a block diagram illustrating a main processor shown in FIG. 2, according to an embodiment.
Figures 4, 5:
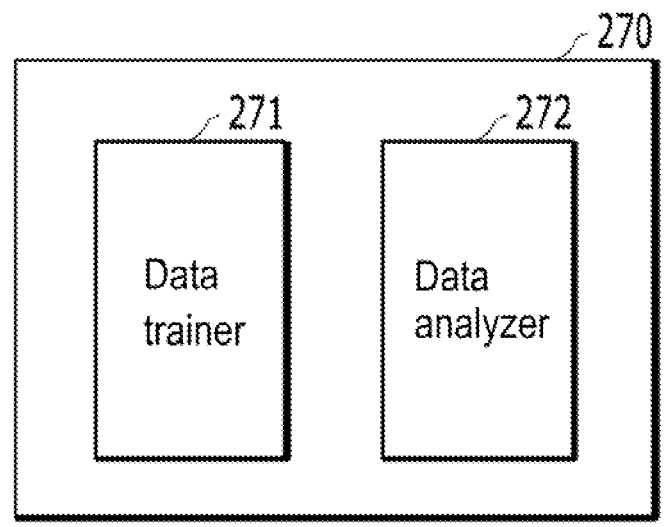
FIG. 4 is block diagram illustrating an embodiment of an AI processor shown in FIG. 2, according to an embodiment.
FIG. 5 is a conceptual diagram illustrating a format of output data of an AI camera, according to an embodiment.

FIG. 2 is a block diagram illustrating an AI camera shown in FIG. 1, according to an embodiment. FIG. 3 is a block diagram illustrating an embodiment of a main processor shown in FIG. 2, according to an embodiment. FIG. 4 is a block diagram illustrating an embodiment of an AI processor shown in FIG. 2, according to an embodiment.

Referring to FIG. 2, an AI camera 200 may include an optical system 205, an image sensor 210, a random access memory (RAM) 220, an electrically erasable and programmable read only memory (EEPROM) 230, a storage 240, a main processor 250, a network interface 260, and an AI processor 270. Here, the AI camera may be each of the AI cameras 121 to 123.

The optical system 205 optically processes light from a subject, and may include at least one lens.

The image sensor 210 may operate in response to control of the main processor 250. The image sensor 210 is configured to convert an optical signal received through the optical system 205 into an electrical signal, and digitize the converted electrical signal to generate an image. For example, the image sensor 210 may include an analog-to-digital converter configured to convert an analog image signal into digital image data.

The RAM 220 is connected to the main processor 250. The RAM 220 may temporarily store an image processed by the main processor 250. The RAM 220 may be used as a buffer memory. The RAM 220 may be used as a working memory of the main processor 250. The electrically erasable and programmable read only memory (EEPROM) 230 may store program codes and/or instructions necessary for an operation of the main processor 250. The storage 240 may store setting data necessary for operations of the main processor 250. In addition, the storage 240 may further store program codes and/or instructions to be executed by the main processor 250. These program codes and/or instructions may be loaded from the storage 240 into the RAM 220 and executed by the main processor 250. At least some of the operations of the main processor 250 to be described below may be performed by the main processor 250 by executing these program codes and/or instructions. In embodiments, the storage 240 may include a nonvolatile storage medium such as a flash memory.

The main processor 250 controls overall operations of the AI camera 200. The main processor 250 may communicate with the components connected to the network 50 (see FIG. 1) through the network interface 260. The main processor 250 is configured to appropriately process the image received from the image sensor 210, and may transmit the processed image to the user terminal 110 through the network interface 260 as a live-view. In addition, the main processor 250 may upload the processed image to the image management server 140 through the network interface 260. Furthermore, the main processor 250 may receive audio data received through a microphone (not illustrated), appropriately process the received audio data, and transmit the processed audio data to an external apparatus through the network interface 260. In this case, the audio data and the image data may constitute multimedia data.

Referring to FIG. 3, the main processor 250 includes a core processor 251, a data formatter 252, a data converter 253, a resizer 254, a moving picture experts group (MPEG) encoder 255, and a joint photographic experts group (JPEG) encoder 256.

The core processor 251 controls general operations of the AI camera 200 (see FIG. 2). In addition, the core processor 251 controls the data formatter 252, the data converter 253, the resizer 254, the MPEG encoder 255, and the JPEG encoder 256. The data formatter 252 may store the image from the image sensor 210 (see FIG. 2) in the RAM 220, the data converter 253 may convert image data of a red (R), green (G), and blue (B) format into luminance (Y) and image data of a chrominance (Cb and Cr) format, and the resizer 254 may convert resolution of the image data. The MPEG encoder 255 is a moving image encoder and may compress moving image data, and the JPEG encoder 256 is a still image encoder and may compress still image data. As such, the main processor 250 is configured to process the image received from the image sensor 210.

In embodiments, components for image processing such as the data formatter 252, the data converter 253, the resizer 254, the MPEG encoder 255, and the JPEG encoder 256 may be implemented through hardware, software, firmware, and combinations thereof, respectively, and may be combined with one another or separated into more components. When at least one of the data formatter 252, the data converter 253, the resizer 254, the MPEG encoder 255, and the JPEG encoder 256 is implemented as software, the software may be stored in a computer-readable storage medium, such as the storage 240 of FIG. 2, and may be executed by the core processor 251. In addition, at least some of the components for image processing, such as the data formatter 252, the data converter 253, the resizer 254, the MPEG encoder 255, and the JPEG encoder 256 may be implemented through one dedicated processor such as an image processor.

Referring to FIG. 2 again, the main processor 250 may command the AI processor 270 to analyze the processed image. The AI processor 270 is configured to analyze the processed image on the basis of an AI method. An image analysis result may be temporarily stored in, for example, the RAM 220, and the main processor 250 may transmit the image analysis result together with the image to the user terminal 110 or the image management server 140 through the network interface 260.

Referring to FIG. 4, the AI processor 270 may include a data trainer 271 and a data analyzer 272. The data trainer 271 may include a deep learning framework, and may accordingly perform a neural network algorithm such as a convolutional neural network (CNN) and a vision algorithm such as a scale invariant feature transform (SIFT). The data trainer 271 may train various image analysis criteria such as object/pattern recognition and similarity inspection between objects. The data trainer 271 may train and infer criteria regarding data to be used for image analysis. The data trainer 271 may train a criterion for image analysis by obtaining data to be used for training and applying the obtained data to a data analysis model.

The data analyzer 272 may perform analysis on an input image in response to a request from the main processor 250

(see FIG. 2). The data analyzer 272 may perform the image analysis using a trained data recognition model. The data analyzer 272 may obtain data according to criteria set by training, perform the image analysis by using the data analysis model using the obtained data as an input value, and output result information according to the image analysis. In addition, the result information of the image analysis may be used to update the data analysis model.

The data trainer 271 and the data analyzer 272 may be implemented through hardware, software, firmware, and combinations thereof, respectively, and may be combined with each other or separated into more components. At least one of the data trainer 271 and the data analyzer 272 may be implemented in the form of a dedicated hardware chip for AI, or may be implemented through a general-purpose processor or a graphics dedicated processor. When at least one of the data trainer 271 and the data analyzer 272 is implemented as software, the software may be stored in a computer-readable storage medium such as the storage 240 of FIG. 2, and executed by a processor such as the general-purpose processor or the graphics dedicated processor.

The data trainer 271 and the data analyzer 272 may be mounted on one electronic device or be mounted on separate electronic devices, respectively. For example, the data trainer 271 may be included in an external device, and the data analyzer 272 may be included in the AI camera 200 (see FIG. 2). In this case, the data trainer 271 and the data analyzer 272 may communicate with each other in a wired or wireless manner, the data trainer 271 may provide constructed model information to the data analyzer 272, and data input to the data analyzer 272 may be provided to the data trainer 271 as additional training data.

Referring to FIG. 2 again, the main processor 250 of an AI camera, which is one of the AI cameras 121 to 123, may configure the cluster CLST (see FIG. 1) for image analysis by exchanging registration information with other AI cameras, which are the others of the AI cameras 121 to 123, and share registration information about the first to n-th normal cameras 13-1 to 13-n with the other AI cameras so as to be able to access the first to n-th normal cameras 13-1 to 13-n. Communication with the other AI cameras and the first to n-th normal cameras 13-1 to 13-n is performed through the network interface 260. When any one of the first to n-th normal cameras 13-1 to 13-n is allocated, the main processor 250 may control the AI processor 270 to analyze an image captured by the allocated normal camera.

FIG. 5 is a conceptual diagram illustrating a format of output data of an AI camera, according to an embodiment.

Referring to FIGS. 2 and 5, the main processor 250 may transmit output data DOUT including a video VD, an audio AD, first metadata META1, and second metadata META2 to the user terminal 110 or the image management server 140 through the network interface 260. The image VD and the audio AD are generated by the main processor 250 as described with reference to FIG. 2. The first metadata META1 may include analysis result information of the AI processor 270 about the image VD and/or the audio AD captured by the AI camera. The second metadata META2 may include analysis result information of the AI processor 270 about the image and/or the audio received from a normal camera.

The second metadata META2 may further include an identifier of the normal camera that transmits the image and/or the audio which the AI processor 270 analyzes. The identifier may include various types of data that may identify the normal camera, such as an ID and an IP address of the normal camera. Therefore, the user terminal 110 or the image management server 140 receiving the output data DOUT may determine which normal camera corresponds to the second metadata META2 included in the output data DOUT.

More detailed contents related to operations of the main processor 250 will be described below.

Figure 6:
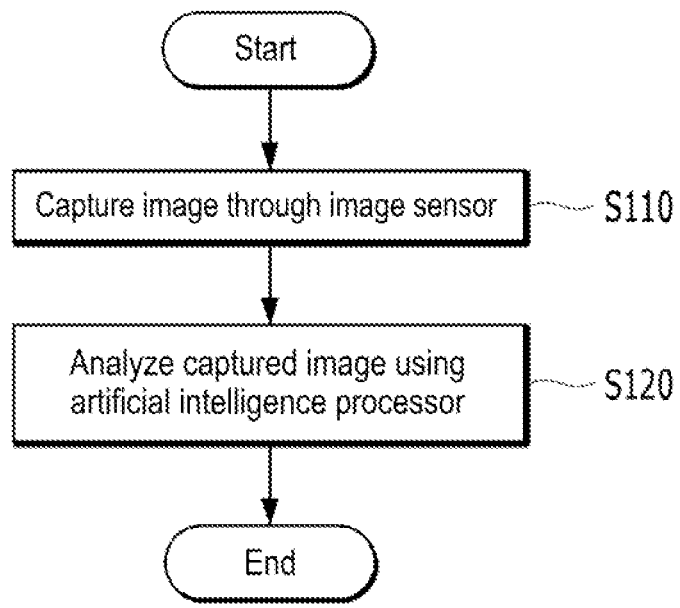
FIG. 6 is a flowchart illustrating a method for analyzing an image captured by the AI camera, according to an embodiment.

FIG. 6 is a flowchart illustrating a method for analyzing an image captured by the AI camera, according to an embodiment.

Referring to FIGS. 2 and 6, in operation S110, an image is captured through the image sensor 210. In operation S120, the captured image is analyzed using the AI processor 270. The main processor 250 may process the image captured through the image sensor 210 and command the AI processor 270 to analyze the processed image. The main processor 250 may include the captured image, the audio, and result information according to the analysis of the image in an image VD field, an audio AD field, and a first metadata META1 field of the output data DOUT illustrated in FIG. 5, respectively.

Figure 7:
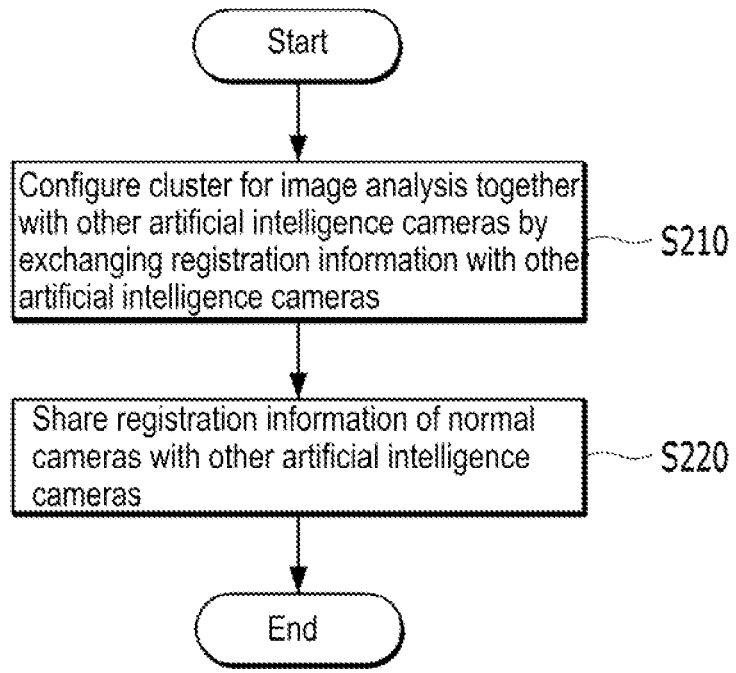
FIG. 7 is a flowchart illustrating an operating method for an AI camera for configuring a cluster capable of interacting with normal cameras, according to an embodiment.
Figure 8:
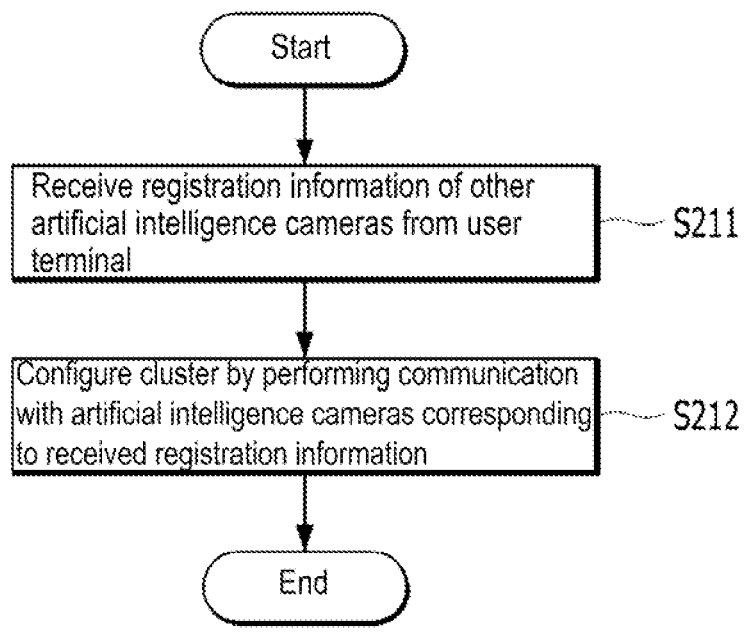
FIG. 8 is a flowchart illustrating operation S210 of FIG. 7, according to an embodiment.
Figure 9:
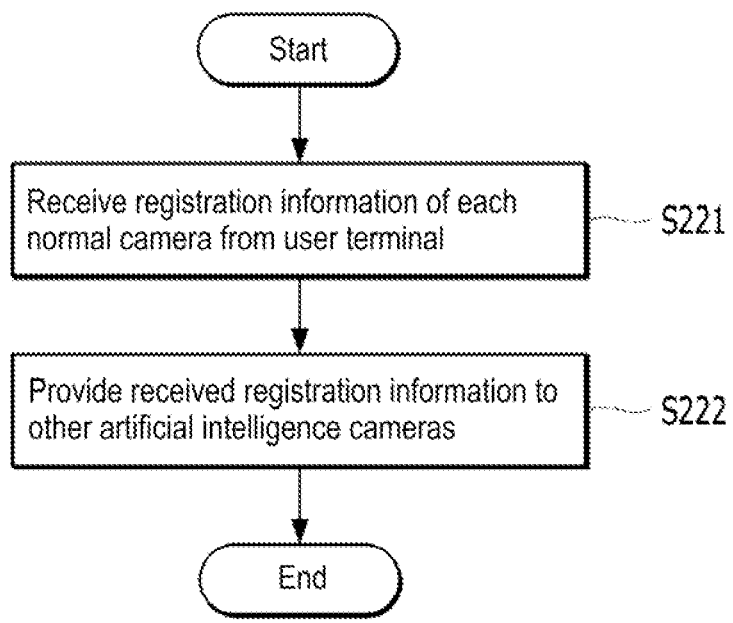
FIG. 9 is a flowchart illustrating an operation S220 of FIG. 7, according to an embodiment.

FIG. 7 is a flowchart illustrating an operating method for an AI camera for configuring a cluster capable of interacting with normal cameras, according to an embodiment. FIG. 8 is a flowchart illustrating operation S210 of FIG. 7, according to an embodiment. FIG. 9 is a flowchart illustrating an operation S220 of FIG. 7, according to an embodiment.

Referring to FIG. 7 together with FIGS. 1 and 2, in operation S210, the AI cameras 121 to 123 configure a cluster for image analysis by exchanging or sharing their respective registration information with one another. The AI cameras 121 to 123 may communicate with one another through the network 50 as described with reference to FIG. 1, and the AI cameras 121 to 123 exchange their registration information so that a cluster CLST including the AI cameras 121 to 123 may be generated.

The registration information about each AI camera may be provided from a user through the user terminal 110. Referring to FIG. 8, the AI camera 200, which may be one of the AI cameras 121 to 123 may receive the registration information about other AI cameras from the user terminal 110 (S211), and configure the cluster CLST together with the AI cameras corresponding to the received registration information by performing communication with the AI cameras corresponding to the received registration information (S212). For example, when the user terminal 110 accesses the AI camera 121 to provide the registration information about the AI cameras 122 and 123 to the AI camera 121, the AI camera 121 accesses each of the AI cameras 122 and 123 using the provided registration information so that the AI cameras 121 to 123 may share the registration information with one another. Therefore, the cluster CLST including the AI cameras 121 to 123 may be generated.

When the cluster CLST is generated, the AI cameras 121 to 123 of the cluster CLST may communicate with one another to perform a negotiation for selecting one of the AI cameras 121 to 123 as a master node. Therefore, the selected one of the AI cameras 121 to 123 may function as the master node, and the other AI cameras may function as agent nodes. The master node may allocate each of the first to n-th normal cameras 13-1 to 13-n to any one of the AI cameras 121 to 123 so as to perform image analysis using a deep learning method on images captured by the first to n-th normal cameras 13-1 to 13-n.

Referring to FIGS. 1, 2 and 7 again, in operation S220, the AI camera 200 shares the registration information about the first to n-th normal cameras 131 to 13n with other AI cameras. Therefore, each of the AI cameras 121 to 123 may access the first to n-th normal cameras 13-1 to 13-n through the network 50. For example, the AI camera 200 may provide the registration information about the normal cameras to other AI cameras, and receive the registration information about the normal cameras from the other AI cameras. In this case, the registration information may include information for accessing the normal camera, such as a uniform resource locator (URL) address, an Internet protocol (IP) address, a port number, and a camera login account of the normal camera.

The registration information about the normal camera may be provided from the user through the user terminal 110. The registration information about the first to n-th normal cameras 13-1 to 13-n may be shared by the AI cameras 121 to 123 according to various methods. Referring to FIG. 9, the AI camera 200 may receive the registration v the first to n-th normal cameras 13-1 to 13-n from the user terminal 110 (S221), and provide the received registration information to other AI cameras (S222). For example, when the user terminal 110 provides the registration information about the first to n-th normal cameras 13-1 to 13-n to the first AI camera 121, the first AI camera 121 may provide the provided registration information to the second and third AI cameras 122 and 123.

Figure 10:
FIG. 10 is a table illustrating cluster information stored in and shared by AI cameras after configuring a cluster, according to an embodiment.

FIG. 10 is a table illustrating cluster information stored in and shared by AI cameras after configuring a cluster, according to an embodiment.

After the cluster CLST is generated, the AI cameras 121 to 123 in the cluster CLST may store and share cluster information CLSTIF with one another. Referring to FIGS. 1 and 10, the cluster information CLSTIF may include IP addresses, use rates of the respective AI processors of the AI cameras 121 to 123 according to processing of tasks based on AI, and use rates of the respective main processors of the AI cameras 121 to 123 that correspond to each of identifiers AICAM1, AICAM2, and AICAM3 of the AI cameras 121 to 123.

The cluster information CLSTIF may be collected by the master node of the AI cameras 121 to 123, and be shared by all of the AI cameras 121 to 123. The master node may allocate each of the first to n-th normal cameras 131 to 13n to any one of the AI cameras 121 to 123 with reference to the use rates of the AI processors and the use rates of the main processors of the cluster information CLSTIF.

The user may access any one of the AI cameras 121 to 123 of the cluster CLST through the user terminal 110 to inquire at least some of the cluster information CLSTIF.

Figure 11:
FIG. 11 is a table illustrating normal camera information stored in and shared by AI cameras after configuring a cluster, according to an embodiment.

FIG. 11 is a table illustrating normal camera information stored in and shared by AI cameras after configuring a cluster, according to an embodiment. FIG. 11 illustrates that five normal cameras are provided in the image capturing system, for convenience of description.

The AI cameras 121 to 123 in the cluster CLST may store and share normal camera information NRMCAMIF with one another. Referring to FIGS. 1 and 11, the normal camera information NRMCAMIF may include IP addresses and detection event types that respectively correspond to identifiers NRMCAM1 to NRMCAM5 of first to fifth normal cameras 131 to 135. In embodiments, the normal camera may include a processor configured to perform image analysis based on at least one of conventional event detection algorithms rather than AI, and the normal camera information NRMCAMIF may further include information on an event type of an event detection algorithm employed in the normal camera. For example, the detection event type may include motion detection, face detection, sound detection, and the like.

Figure 12:
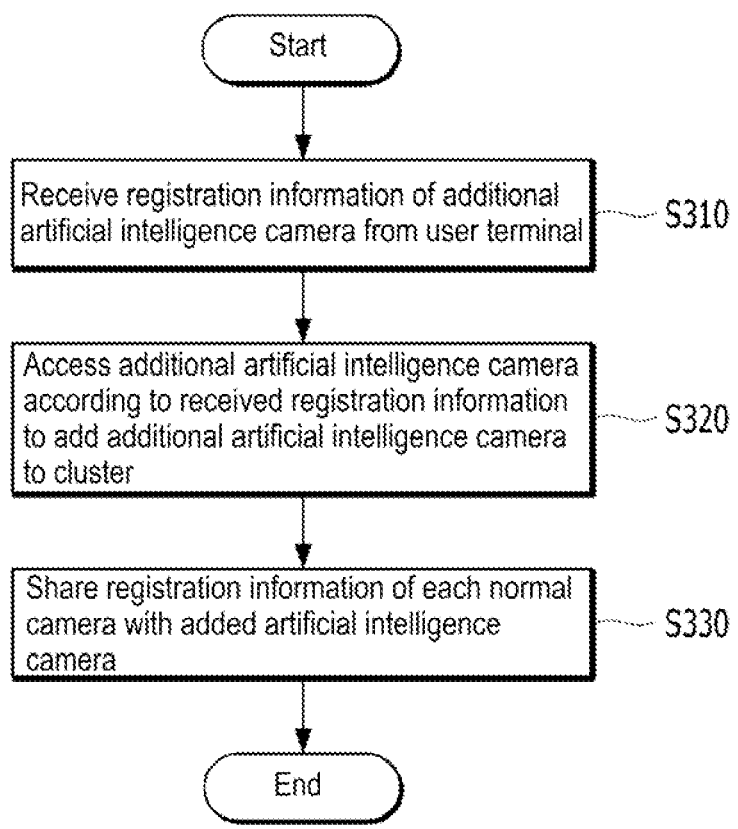
FIG. 12 is a flowchart illustrating a method for adding an AI camera to a cluster capable of interacting with normal cameras, according to an embodiment.

FIG. 12 is a flowchart illustrating a method for adding an AI camera to a cluster capable of interacting with normal cameras, according to an embodiment.

Referring to FIG. 12 together with FIGS. 1 and 2, in operation S310, the AI camera 200 may receive registration information about an additional AI camera from the user terminal 110. In operation S320, the AI camera 200 accesses the additional AI camera according to the received registration information to add the additional AI camera to the cluster CLST. In addition, the received registration information may be shared by the AI cameras in the cluster CLST including the AI camera 200. For example, when the registration information about the additional AI camera input by the user is provided to the AI camera 121 through the user terminal 110, the first AI camera 121 may transmit the provided registration information to the AI cameras 122 and 123. Each of the AI cameras 121 to 123 may access the additional AI camera according to the provided registration information, and the AI cameras 121 to 123 and the additional AI camera may share the registration information with one another. Therefore, the additional AI camera may be added to the cluster CLST.

In S330, the AI camera 200 may share the registration information about each normal camera with the added AI camera. For example, the AI cameras 121 to 123 may share the normal camera information NRMCAMIF (see FIG. 11) with the additional AI camera.

As such, resources of the cluster CLST may be relatively easily expanded. Accordingly, it is possible to increase the number of normal cameras for which image analysis based on AI may be supported while expanding a monitoring range by image capturing by adding the AI camera that may capture an image by itself without providing or further installing a server including separate AI function.

Figure 13:
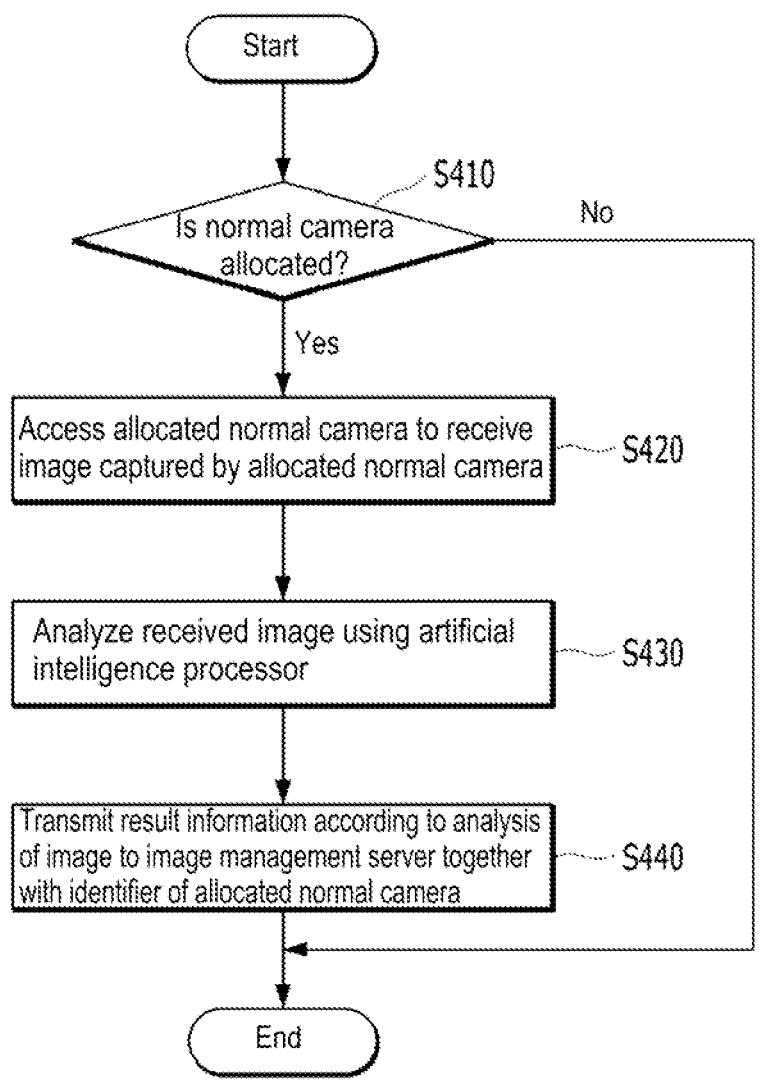
FIG. 13 is a flowchart illustrating a method for analyzing an image of a normal camera by the AI camera included in a cluster, according to an embodiment.

FIG. 13 is a flowchart illustrating a method for analyzing an image of a normal camera by the AI camera included in a cluster, according to an embodiment.

Referring to FIG. 13 together with FIGS. 1 and 2, in operation S410, one of the first to n-th normal cameras 13-1 to 13-n may be allocated to the AI camera 200. As described above, the allocation may be performed by the master node of the AI cameras 121 to 123 in the cluster CLST. In this case, the AI camera 200 may be the master node or be the agent node. When the normal camera is allocated, operation S420 is performed.

In operation S420, the AI camera 200 accesses the allocated normal camera to receive an image captured by the allocated normal camera.

In operation S430, the AI camera 200 analyzes the received image using the AI processor 270.

In operation S440, the AI camera 200 transmits result information according to the analysis of the image to the image management server 140 together with an identifier of the allocated normal camera. The AI camera 200 may include the result information according to the analysis of the image and the identifier of the normal camera in a second metadata META2 field of the output data DOUT illustrated in FIG. 5.

As such, by analyzing the images captured by the first to n-th normal cameras 13-1 to 13-n through the cluster CLST including the AI cameras 121 to 123, each normal camera may be allocated to one of the AI cameras 121 to 123 with reference to, for example, the available resources. Accordingly, the analysis of the images captured by the first to n-th normal cameras 13-1 to 13-n may be efficiently performed using the AI cameras 121 to 123 provided in advance without providing a server including a separate AI function.

Therefore, the image analysis based on the AI may be expanded to the images captured by the first to n-th normal cameras 13-1 to 13-n as well as the images captured by the AI cameras 121 to 123, without providing a server including a separate AI function. Accordingly, an image analysis method capable of efficiently expanding a range of the image analysis based on the AI may be provided.

Figure 14:
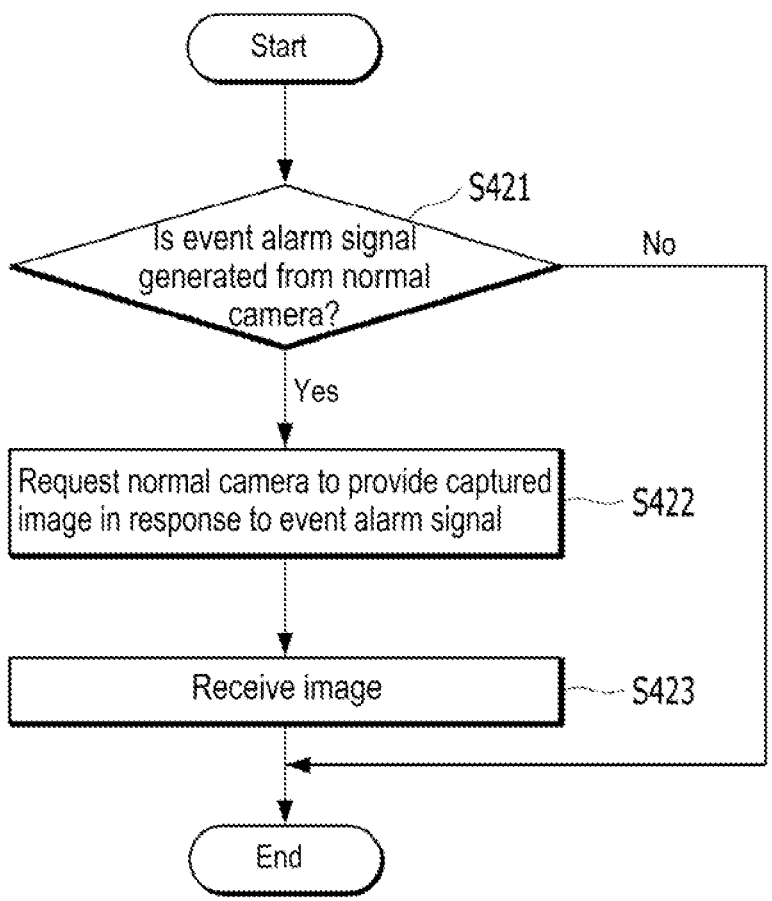
FIG. 14 is a flowchart illustrating an operation S420 of FIG. 12, according to an embodiment.

FIG. 14 is a flowchart illustrating an operation S420 of FIG. 12, according to an embodiment.

Referring to FIG. 14 together with FIGS. 1 and 2, in operation S421, the AI camera 200 may receive an event alarm signal from any one of the allocated normal cameras 13-1 to 13-n. When the event alarm signal is received, operation S422 may be performed.

A normal camera may be configured to perform conventional event detection algorithms such as motion detection, face detection, and sound detection rather than AI, and may generate an event alarm signal in response to detection of an event. In embodiments, the AI camera 200 may request the normal camera to provide the event alarm signal in response to the detection of the event, or in response to the allocation of the normal camera, and the normal camera may provide the event alarm signal to the AI camera 200. In embodiments, the master node may request the normal camera to provide the event alarm signal in response to the detection of the event, and the normal camera may provide the event alarm signal to the master node. In this manner, when the AI camera 200 is the master node, the AI camera 200 may receive the event alarm signal from the normal camera. When the AI camera 200 is the agent node, the AI camera 200 may receive the event alarm signal through the master node.

When the normal camera detects an event, the normal camera may enter a special mode that supports image analysis through AI (or deep learning). For example, the normal camera may change internal setting values into predetermined values. Detection of an event means that image analysis through AI is required, and the normal camera may thus change setting values into values predetermined to be suitable for an image analysis through AI. An image transmitted to the image management server 140 to be suitable for being provided to a user through a display and an image suitable for an image analysis through AI may be different from each other. When the normal camera is set to capture an image suitable for an image analysis through AI, a user who views the image received through the image management server 140 may feel uncomfortable. For this reason, the normal camera may be set to capture an image suitable for being provided to a user at ordinary times. On the other hand, when the AI camera 200 receives an image suitable for being provided to a user and performs image analysis on the image, it is required to perform pre-processing on the image so that the image is suitable for the image analysis. Many noises may be generated in the image in a preprocessing process, and it may take a lot of time to perform the preprocessing process. For this reason, the setting values of the normal camera may be changed into values suitable for an image analysis through AI, and the AI camera 200 may receive an image captured under corresponding setting from the normal camera. Therefore, the AI camera 200 may perform an image analysis quickly and accurately without performing the pre-processing on the image or through a reduced pre-processing process. That is, setting values such as sharpness or exposure may be adjusted to be suitable for the AI camera 200 to make an image quality of the normal camera suitable for AI (or the deep learning). The normal camera may change the setting values in response to a setting value control request from the AI camera 200 or change the setting values in response to detection of an event. Alternatively, the normal camera may change the setting values in response to control of the image management server 140. The entry of the normal camera into the special mode may be performed before operation S422.

The normal camera may change the internal setting values into values of the special mode only while capturing frames necessary for an image analysis through AI, and then change the setting values back to the previous setting values. Alternatively, the AI camera 200 may control the normal camera to restore the setting values when the image analysis of the AI camera 200 ends.

In operation S422, the AI camera 200 requests the normal camera to provide a captured image in response to an event alarm signal.

In operation S423, the AI camera 200 may receive the image from the normal camera and analyze the received image using the AI processor 270.

As another embodiment, the AI camera 200 may access the allocated normal camera at any time to receive an image and analyze the received image.

When the AI camera 200 analyzes the image of the normal camera, the AI camera 200 may variably control a length of the image received from the normal camera through operations S422 and S423 depending on whether a probability according to deep learning (or the artificial intelligence) is greater than or equal to a threshold value. The AI processor 270 may output, for example, the probability according to the deep learning together with image analysis through the deep learning, and when this probability is greater than or equal to the threshold value, it may mean that the image analysis is completed. When the probability according to the deep learning is greater than or equal to the threshold value, additional image analysis is not required, and thus, the AI camera 200 and/or the main processor 250 may variably adjust the length of the image received from the normal camera depending on whether the probability according to the deep learning is greater than or equal to the threshold value. The AI camera 200 may receive an image having a relatively short length or an image having a relatively long length depending on whether the probability according to the deep learning is greater than or equal to the threshold value. For example, the AI camera 200 may request and receive an additional image when the additional image is required, and in this case, a length of the additional image, the number of times to request for the additional image, and the like, may be variably adjusted depending on the probability according to the deep learning.

When the AI camera 200 receives a still image from the normal camera, the AI camera 200 may request an additional still image depending on whether the probability according to the deep learning is greater than or equal to the threshold value, and when the AI camera 200 receives a dynamic image from the normal camera, the AI camera 200 may request the normal camera to stop transmitting the dynamic image depending on whether the probability according to the deep learning is greater than or equal to the threshold value.

As such, the AI camera 200 may variably control the length of the image received from the normal camera depending on whether the probability according to the deep learning is greater than or equal to the threshold. Therefore, a time required for changing or restoring the setting values of the normal camera may also be shortened.

Figure 15:
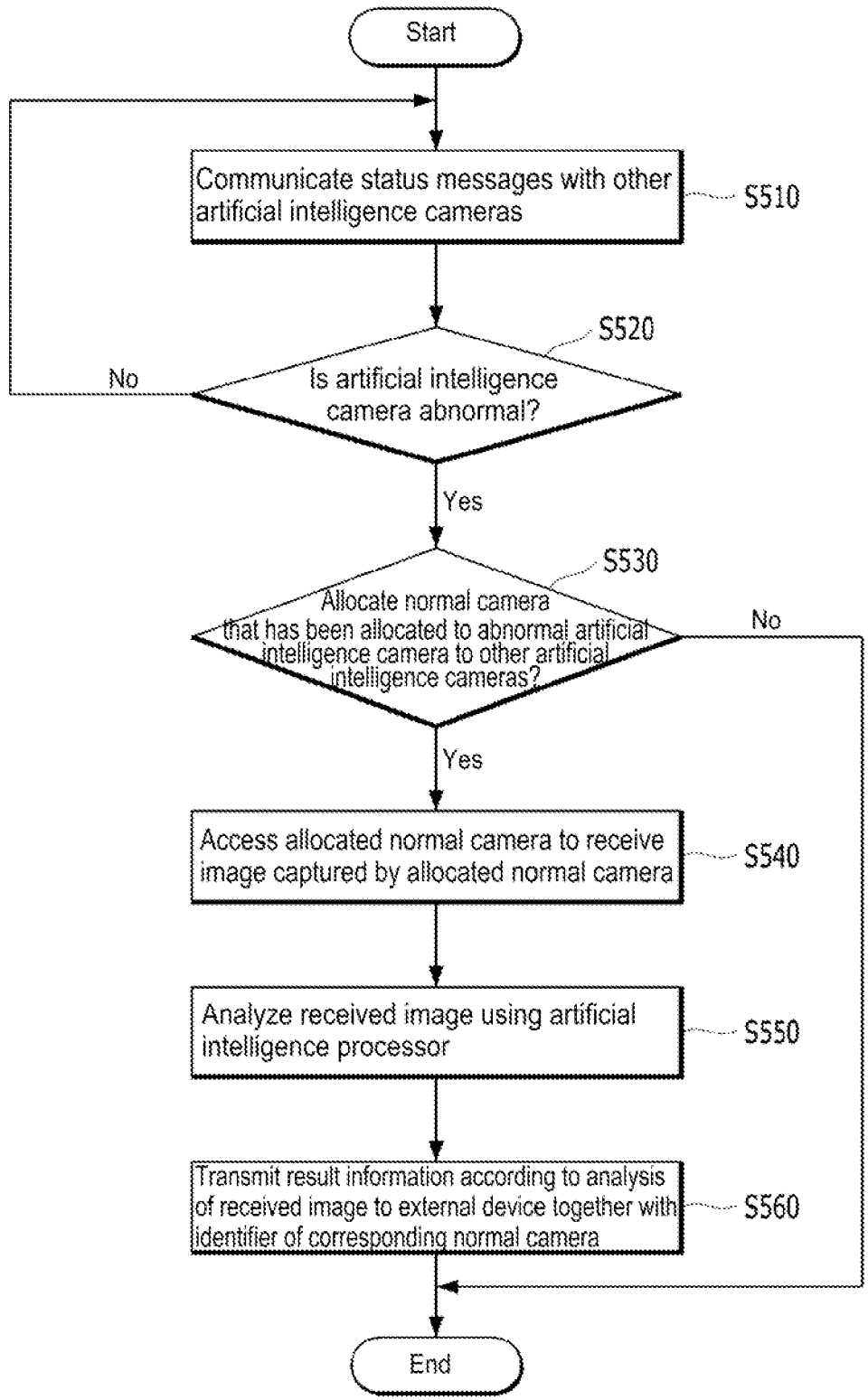
FIG. 15 is a flowchart illustrating a method for analyzing an image of the normal camera by an AI camera included in a cluster according to an embodiment.

FIG. 15 is a flowchart illustrating a method for analyzing an image of the normal camera by an AI camera included in a cluster according to an embodiment.

Referring to FIG. 15 together with FIGS. 1 and 2, in S510, the AI camera 200 transmits and receives status messages to and from other AI cameras to determine whether an abnormal AI camera exists among the AI cameras 121 to 123 in the cluster CLST. The AI cameras 121 to 123 may periodically exchange the status messages with one another.

In operation S520, the AI camera 200 performs operation S530 when the AI camera in the cluster CLST is abnormal. Hereinafter, for convenience of description, it is assumed that the AI camera 200 is the master node of the cluster CLST.

Operation S530 may be performed by the master node. In operation S530, the AI camera 200 may allocate the normal camera that has been allocated to the abnormal AI camera to another AI cameras. The master node may allocate the corresponding normal camera to any one of the AI cameras 121 to 123 with reference to the use rates of the AI processors and the use rates of the main processors of the cluster information CLSTIF (see FIG. 10). Hereinafter, for convenience of description, it is assumed that the corresponding normal camera is allocated to the AI camera 200.

In operation S540, the AI camera 200 accesses the allocated normal camera to receive an image. In operation S550, the AI camera 200 analyzes the received image using the AI processor 270. In operation S560, the AI camera 200 transmits result information according to analysis of the image to the image management server 140 together with an identifier of the corresponding normal camera.

As such, an abnormal resource in the cluster CLST may be relatively easily excluded from the cluster CLST, and accordingly, the image analysis based on AI may be stably performed on the image of the normal camera. For example, a time during which the image analysis based on AI is not provided for the normal camera may be reduced or minimized.

Many modifications and other embodiments will come to the mind of one skilled in the art having the benefit of the teachings presented in the foregoing descriptions and the associated drawings. Therefore, it is understood that the inventive concept is not to be limited to the specific embodiments disclosed, and that modifications and embodiments are intended to be included within the scope of the appended claims.

What is claimed is:

1. An operating method for an artificial intelligence (AI) camera that communicates with at least one another AI camera through a network, the AI camera comprising an AI processor configured to perform image analysis using a deep learning method, the operating method comprising:
configuring a cluster for the image analysis together with the other AI camera by exchanging registration information about at least one of the AI camera and the other AI camera with the other AI camera through the network;
sharing, with the other AI camera, registration information about normal cameras used to access the normal cameras through the network;
receiving, based on one of the normal cameras being allocated to AI camera, an image captured by the allocated normal camera by accessing the allocated normal camera; analyzing the received image using the AI processor; and transmitting a result of the analyzing the received image together with an identifier of the allocated normal camera to an external device through the network,
wherein the receiving the image captured by the allocated normal camera comprises:
receiving the image having a first length from the allocated normal camera, when a probability according to deep learning is greater than or equal to a threshold value based on the received image being analyzed using the AI processor; and
receiving the image having a second length from the allocated normal camera, when the probability according to deep learning is smaller than the threshold value based on the received image being analyzed using the AI processor,
wherein the second length is greater than the first length.

2. The operating method of claim 1, further comprising:
receiving registration information about an additional AI camera; and
accessing the additional AI camera according to the received registration information to add the additional AI camera to the cluster.

3. The operating method of claim 1, wherein the configuring the cluster comprises communicating with the other AI camera to determine one of the AI camera and the other AI camera as a master node of the cluster, and
wherein the allocated normal camera is selected according to a command from the master node.

4. The operating method of claim 1, wherein the receiving the captured image includes:
receiving an event alarm signal generated by the allocated normal camera; and
requesting the allocated normal camera to provide the captured image in response to the event alarm signal.

5. The operating method of claim 4, wherein the configuring the cluster comprises communicating with the other AI camera to determine one of the AI camera and the other AI camera as a master node of the cluster, and
wherein the event alarm signal is received through the master node.

6. The operating method of claim 4, wherein the receiving the captured image further comprises changing a setting value of the allocated normal camera into a predetermined value in response to the event alarm signal before requesting the allocated normal camera to provide the captured image.

7. The operating method of claim 1, further comprising:
communicating status messages with the other AI camera;
additionally receiving an image captured by another normal camera allocated to the other AI camera by accessing the other normal camera based on the other AI camera being determined to be abnormal on the basis of the status messages;
analyzing the additionally received image using the AI processor; and
transmitting a result of the analyzing the additionally received images together with an identifier of the other normal camera to the external device through the network.

8. The operating method of claim 1, wherein the AI camera further comprises an image sensor, and
wherein the operating method further comprises:
capturing an image through the image sensor; and
analyzing the captured image using the AI processor.

9. The operating method of claim 8, wherein the transmitting the result of the analyzing the received image together with the identifier of the allocated normal camera to the external device through the network comprises transmitting the captured image, first metadata, and second metadata to the external device,
  wherein the first metadata comprises a result of the analyzing the captured image, and
  wherein the second metadata comprises the result of the analyzing the received image and the identifier of the allocated normal camera.

10. The operating method of claim 1, wherein the configuring the cluster comprises:
  receiving the registration information about the other AI camera from a user terminal; and
  configuring the cluster by performing communication with the other AI camera using the received registration information.

11. The operating method of claim 1, wherein the sharing the registration information about the normal cameras with the other AI camera comprises:
  receiving the registration information about the normal cameras from a user terminal; and
  providing the received registration information to the other AI camera.

12. A camera comprising:
  an optical system;
  a first processor configured to process an image generated according to light received through the optical system;
  a second processor configured to operate in response to control of the first processor and analyze the processed image on the basis of a deep learning method; and
  a network interface providing communication through a network,
  wherein the first processor is configured to:
  configure a cluster for an image analysis together with at least one external AI camera by exchanging registration information about at least one of the camera and the external AI camera with the external AI camera through the network;
  share, with the external AI camera, registration information about normal cameras used to access the normal cameras through the network;
  receive, based on one of the normal cameras being allocated, an image captured by the allocated normal camera by accessing the allocated normal camera;
  control the second processor to analyze the received image; and
  transmit a result of the analysis of the received image together with an identifier of the allocated normal camera to an external device through the network,
  wherein the first processor is configured to adjust a length of the image to a first length when a probability according to deep learning is greater than or equal to a threshold value based on the received image being analyzed by the second processor, and adjust a length of the image to a second length when the probability according to deep learning is greater than or equal to the threshold value based on the received image being analyzed by the second processor and,
  wherein the second length is greater than the first length.

13. The camera of claim 12, wherein the first processor is configured to access an additional AI camera according to registration information about the additional AI camera to add the additional AI camera to the cluster, based on the registration information about the additional AI camera being received.

14. The camera of claim 12, wherein the first processor is configured to communicate with the external AI camera to determine one of the camera and the external AI camera included in the cluster as a master node of the cluster, and
  wherein the allocated normal camera is selected according to a command from the master node.

15. The camera of claim 14, wherein, based on being selected as the master node, the first processor is further configured to allocate another normal camera among the normal cameras to the external AI camera based on determining a resource of the external AI camera so that an image captured by the other normal camera is analyzed by the external AI camera.

16. The camera of claim 12, wherein the first processor is configured to change a setting value of the allocated normal camera into a predetermined setting value before requesting the allocated normal camera to provide the captured image.

17. The camera of claim 16, wherein the captured image is an image captured by the allocated normal camera according to the predetermined setting value, and
  wherein the setting value comprises a value of sharpness and a value of exposure.

18. The camera of claim 12, wherein the registration information about at least one of the camera and the external AI camera comprises at least one of a uniform resource locator (URL) address, an Internet protocol (IP) address, a port number, and a camera login account.

* * * * *